3,420,618
GAS PURIFICATION BY HYDROGENATION
Harold W. Fleming, Louisville, Ky., assignor to Catalysts and Chemicals Inc., a corporation of Delaware
No Drawing. Filed July 6, 1965, Ser. No. 469,896
U.S. Cl. 23—2                                                5 Claims
Int. Cl. C01b 2/00

ABSTRACT OF THE DISCLOSURE

A process for removing by hydrogenation either oxygen and acetylene or oxygen, acetylene and ethylene from a gaseous mixture additionally containing hydrogen and carbon monoxide comprising contacting said gaseous mixture at a temperature of 250° F. to 700° F. with a palladium catalyst supported on activated alumina having a surface area of 200–450 square meters per gram. To selectively hydrogenate oxygen and acetylene without converting carbon monoxide to methane or carbon dioxide, 0.1 to 0.3 weight percent of palladium is utilized whereas when the selective hydrogenation of oxygen, acetylene and ethylene is desired the amount of palladium used is 0.5 to 1.0 weight percent.

---

This invention pertains to the treatment of gas streams containing primarily hydrogen and carbon monoxide.

As is well known, acetylene is the base material for almost countless compounds. It can be polymerized to form benzene and ethyl benzene. It can be reacted with water to form aldehydes and ketones. By virtue of its reaction with halogens, hydrogen halide, hydrogen and water, it is a starting material for an almost inestimable number of organic compounds. The demand for acetylene hence has led to its production by virtually all available methods.

One method which is widely employed for the production of acetylene is the pyrolysis of methane or natural gas. Methane or natural gas is burned by the use of oxygen in a furnace or "Sacchse" generator at 1200° F. to 1800° F. The acetylene gas stream which results is sometimes called "Sacchse gas." After the acetylene has been removed, the remaining or by-product gas is still extremely valuable, and it is used as a source for carbon monoxide and hydrogen. The by-product stream after removal of acetylene from the Sacchse gas is a gas stream containing primarily hydrogen and carbon monoxide, but also small quantities of oxygen, acetylene and ethylene. The composition of this gas stream after removal of the acetylene is:

| Component: | Range, mol percent |
|---|---|
| $H_2$ | 55–65 |
| CO | 25–35 |
| $O_2$ | [1] 0.1–0.5 |
| Acetylene | 0.5–1 |
| Ethylene | 0.2–3.0 |

[1] Normally—Upsets as high as 3 to 4%.

It can be seen that the by-product Sacchse gas stream contains approximately two mols of hydrogen per mol of carbon monoxide. It is, therefore, very suitable as a feed stream for methanol synthesis. It can also be seen that although acetylene was removed from the initial gas mixture, there are still small quantities of acetylene present. The purification of this gas stream therefore involves the removal of oxygen, acetylene and sometimes the ethylene depending upon demands. For methanol synthesis, there are two views on the effect of ethylene in the feed gas stream. Some manufacturers of methanol require that only the oxygen and acetylene be removed, whereas others require not only oxygen and acetylene removal but also ethylene. One reason for the requirement that ethylene be removed is that while it is frequently ignored as a poison in methanol synthesis, there are those who believe that it is at least an inhibitor.

Various methods have been employed for the purification of a by-product gas stream such as this, but hydrogenation is preferred because of the hydrogen present in the gas stream. Since a large quantity of carbon monoxide is also present, a hydrogenation process must be highly selective in order to hydrogenate at least the acetylene and and oxygen without converting carbon monoxide. Acetylene can be removed more readily than oxygen. However, oxygen is removed more readily than ethylene. Moreover, while it is known that acetylene and oxygen can be very successfully removed from a stream containing hydrogen and carbon monoxide, the literature does not teach that ethylene can also be successfully removed from such a gas stream. In either case these hydrogenation processes must be performed selectively without hydrogenating carbon monoxide to methane, or shifting carbon monoxide to carbon dioxide by reaction with water vapor, either already present or formed by the hydrogenation of oxygen. In addition the catalyst employed in such a selective hydrogenation process must not promote coke formation by reaction of two carbon monoxide molecules to give carbon dioxide and carbon, thus $2CO \rightarrow CO_2 + C$.

Considering now catalysts which might be used for the hydrogenation of acetylene, oxygen, and, if desired, ethylene, in a hydrogen-carbon monoxide gas stream, iron oxide cannot be employed because, as is well known, iron oxide promotes the reaction of two carbon monoxide molecules to form carbon dioxide and carbon. Nickel oxide catalysts are well known hydrogenation catalysts. However, certain factors prevent their effective use in this selective hydrogenation. The quantity of oxygen in the by-product gas stream with which this invention is concerned may be as high as 3 to 4 percent. It is not known what happens when the Sacchse generator gets upset, whether it is a flow condition, or an oxygen accumulation due to too much oxygen or too little natural gas being fed to the generator. Whatever the cause, in commercial operation, a fluctuation in the amount of oxygen is inevitable. The chosen catalyst must, therefore, be so selective that there is no danger of a runaway reaction due to the hydrogenation of carbon monoxide. This danger is encountered when a catalyst of nickel on alumina is used. Using a nickel catalyst, the temperature which initiates the hydrogenation of oxygen is very close to that which initiates a reaction with carbon monoxide. With everything under proper control, acetylene and oxygen can be hydrogenated with a nickel catalyst, but if the amount of oxygen is unduly high the temperature rapidly approaches 500° F. to 600° F., the temperature at which the hydrogenation of carbon monoxide is initiated. This can be seen from the following wherein a nickel on a modified alumina catalyst of the following composition is employed.

EXAMPLE A

Catalyst composition:
| | |
|---|---|
| Nickel | 13.8 |
| Alumina support | 86.2 |

Composition of support:
| | |
|---|---|
| $Al_2O_3$ | 86.96 |
| $SiO_2$ | 11.65 |
| $Fe_2O_3$ | 0.30 |
| $TiO_2$ | 0.42 |
| $Na_2O$ | 0.32 |
| $K_2O$ | 0.17 |
| MgO | 0.11 |
| CaO | 0.05 |
| $ZrO_2$ | 0.02 |

TABLE A

| Temp., °F. | S.V. | CO In | CO Out | CO₂ In | CO₂ Out | CH₄ In | CH₄ Out | C₂H₄ In | C₂H₄ Out | C₂H₆ In | C₂H₆ Out |
|---|---|---|---|---|---|---|---|---|---|---|---|
| 400 | 1,000 | 28.8 | 28.3 | 2.5 | 2.6 | .07 | .35 | 1.55 | 0 | 0 | 2.2 |
| 500 | 500 | 26.6 | 25.1 | 2.2 | 2.4 | .06 | .8 | 1.56 | 0 | 0 | 2.2 |
| 500 | 1,000 | 32.8 | 32.2 | 2.7 | 2.6 | .12 | .13 | 1.82 | 0 | 0 | 2.5 |
| 550 | 500 | 26.4 | 23.2 | 2.7 | 3.0 | .1 | 4.2 | 1.86 | 0 | 0 | 3.0 |
| 550 | 1,000 | 32.7 | 28.6 | 2.7 | 2.8 | .1 | 2.7 | 1.8 | 0 | 0 | 2.7 |
| 550 | 1,000 | 31.3 | 28.1 | 2.9 | 3.0 | .1 | 2.1 | 1.9 | 0 | 0 | 2.8 |
| 600 | 1,000 | 26.6 | 0 | 2.2 | 11.9 | 0 | 21.7 | 1.6 | 0 | 0 | 0 |

At about 600° F. the temperature rapidly rises toward its theoretical limit. Such being the case, a catalyst is desired which will hydrogenate oxygen at a lower temperature. Obviously nickel catalysts are unsuitable for the hydrogenation of ethylene in a gas stream containing carbon monoxide because the temperature required to initiate the hydrogenation of ethylene with nickel is even higher, being above 500° F.

In accordance with one aspect of this invention a process is provided for the hydrogenation of acetylene and oxygen in a gas stream containing primarily hydrogen and carbon monoxide without the danger of a temperature runaway regardless of fluctuations in the oxygen content of the stream. In accordance with another aspect of this invention a solution to the even more difficult problem is provided, that of hydrogenating ethylene, as well as acetylene and oxygen, when all three of these components are present in a stream also containing carbon monoxide and hydrogen.

According to the practice of this invention it has been found that palladium on activated alumina is selective in all respects, different concentrations of palladium being employed for the removal of acetylene and oxygen and for the removal of acetylene, oxygen and ethylene. I have found that using these palladium catalysts, the initiation temperature for carbon monoxide hydrogenation is above 700° F., rather than between 500° F. and 600° F. as is the case with nickel catalysts. Hence the catalysts contemplated herein do not hydrogenate carbon monoxide present in the gas stream.

As indicated hereinbefore the concentration of palladium on the alumina carrier depends upon whether ethylene, which is more difficult to hydrogenate than oxygen, is also to be removed. Broadly, the range of palladium concentration C is $0.1 \leqslant C \leqslant 1$ percent weight based on the catalyst. Considering this overall range, the most desirable range for the removal of acetylene, oxygen and ethylene is $0.5 \leqslant C \leqslant 1$, weight percent, preferably $0.5 \leqslant C \leqslant 0.6$. If only acetylene and oxygen are to be removed the palladium content of the catalyst will be in the range of $0.1 \leqslant C \leqslant 0.3$ weight percent based on the catalyst. Between 0.3 weight percent palladium and 0.5 weight percent palladium it is possible to remove some ethylene as well as acetylene and oxygen. However flow rates, the quantity of catalyst and other conditions required would make this a less economical operating range. It would also be impractical to use this concentration of palladium merely for the removal of acetylene and oxygen. Likewise, as the palladium content approaches 1 percent cost factors render the process less and less practical.

It is to be understood that all forms of alumina cannot be employed as supports for the catalysts of this invention. The alumina support acting as a carrier for palladium in the catalysts employed herein is activated alumina, that is aluminum oxide which has been calcined or otherwise heated with steam or air, etc., to raise its surface area to above 50 square meters per gram, preferably in the range of 200 to 400 square meters per gram.

Hydrogenation processes are well known, and no departures from well known hydrogenation processes are required herein. The gas is passed in contact with catalyst surfaces, in other words, through the catalyst mass, in a reactor operated at the proper temperature. The pressures will be in the range 100 to 1000 p.s.i.g., preferably 100 to 500 p.s.i.g., and the space velocity will be in the range of 2,000 to 10,000 gas volumes per volume of catalyst per hour.

Initiation temperatures have already been discussed, the temperatures employed herein being below the initiation temperature for the hydrogenation of carbon monoxide, which is between 700° F. and 750° F. with the catalysts contemplated herein. The hydrogenation process is thus conducted at a temperature in the range of 250° F. to 700° F. The only limitation on the hydrogenation process concerns the catalyst involved in the process. Since all palladium catalysts are poisoned by acidic sulphur compounds the feed gas must be free of sulphur compounds that are acidic in nature. This is no problem, however, because natural gas free of sulphur is readily obtained.

Hydrogenation with the catalyst of this invention can perhaps be better exemplified by reference to specific data. These runs are illustrative only since various modifications in the process are possible. The data was obtained as follows:

The impure methanol synthesis gas was passed over a 50 cc bed of catalyst contained in a three-foot piece of schedule 40 type 316SS ¾-inch diameter pipe. This pipe was fitted with a two-inch type 316SS jacket leaving about four inches on each end without a jacket. The jacket was equipped with a water condenser. A 2000 watt electrical heater surrounded the bottom half of the jacket so as to supply heat to boil a liquid contained in the jacket. The vapors from the boiling liquid were condensed in the condenser and returned to the liquid in the jacket. A catalyst support attached to the thermocouple well extending from the bottom of the ¾″ pipe positioned the 50 cc of catalyst in about the middle of the reactor. Another thermocouple well extended from the top of the reactor to the top of the catalyst bed. Thus temperature measurements were taken both at the top and the bottom of the catalyst bed. The temperature of the catalyst bed was regulated by the temperature of the boiling liquid in the jacket. The impure methanol synthesis gas was preheated in the section of the ¾″ pipe extending above the catalyst bed. The impure methanol synthesis gas under the desired pressure was passed into the top of the reactor, down through the 50 cc bed of catalyst, out of the bottom of the reactor through a cooler, a pressure reducing valve, a needle valve, and finally measured with a wet test meter. The space velocity of the feed gas over the catalyst was changed by the proper setting of the needle valve. The temperature of the catalyst bed was changed by regulating the pressure over the boiling liquid by means of a regulator on a cylinder of nitrogen. The inlet and outlet gas was analyzed for methane, ethane, ethylene, acetylene, carbon monoxide, and carbon dioxide on a gas chromatograph. Several samples were analyzed at each condition to be certain of the results.

For use in the process described, the following catalysts were prepared:

EXAMPLE B

Alumina was formed into pellets and calcined at 950° F. to be used as a carrier. An amount of water required to completely cover a given quantity of these pellets, normally 100 parts by weight of pellets, was measured out. For each 100 parts by weight of carrier 0.1 part by weight of palladium, as the chloride, was dissolved in the pre-measured quantity of water. The 100 parts by weight of carrier pellets were then submerged in the palladium chloride solution and allowed to stand 30 minutes. The liquid was drained off and the pellets dried at 250° F. The pellets were then subsequently calcined at 650° F. to form a 0.1 percent palladium catalyst.

EXAMPLE C

Following the procedure of Example B, a similar catalyst was made except that 0.6 part by weight of palladium, as the chloride, was used instead of 0.1. The catalyst resulting was an 0.6 percent palladium catalyst on an alumina carrier.

Hydrogenation processes were conducted using the procedure described, with catalyst A and catalysts of examples B and C. The conditions and results of these processes with the various catalysts are set forth in the following examples.

EXAMPLE D

Following the procedure of Example A, a hydrogenation run was conducted using catalyst A. The conditions and results of this process were as follows:

Conditions:
- Catalyst _____ 13.8% Ni (Cat. A.).
- Pressure _____ 135 p.s.i.g.
- Temperature _____ As given.
- Space velocity _____ Do.

Composition of feed gas stream:
- CO _____ 31.0
- $H_2$ _____ 63.0
- $C_2H_4$ _____ 2.5
- $C_2H_2$ _____ 0.1
- $O_2$ _____ 0.1
- $N_2$ _____ 3.3

100.0

Acetylene was removed but some oxygen remained in the stream. However the course of the reaction can be best followed by an examination of carbon monoxide, carbon dioxide and methane values.

TABLE I.—LABORATORY TEST RESULTS

| Temp. (°F.) | S.V. | CO In | CO Out | $CO_2$ In | $CO_2$ Out | $CH_4$ In | $CH_4$ Out | $C_2H_4$ In | $C_2H_4$ Out | $C_2H_6$ In | $C_2H_6$ Out |
|---|---|---|---|---|---|---|---|---|---|---|---|
| 212 | 500 | 30.6 | 30.6 | 2.7 | 2.74 | .07 | .07 | 1.9 | 2.0 | 0 | 0 |
| 300 | 500 | 30.2 | 29.9 | 2.7 | 2.9 | .08 | .09 | 1.9 | 1.5 | 0 | .5 |
| 325 | 1,000 | 31.1 | 30.5 | 2.65 | 3.0 | .11 | .11 | 2.5 | 1.8 | 0 | .6 |
| 350 | 500 | 30.1 | 29.7 | 2.9 | 2.6 | .07 | .09 | 1.9 | 0.2 | 0 | 2.1 |
| 350 | 1,000 | 30.4 | 29.9 | 2.8 | 3.1 | .11 | .10 | 2.5 | 1.8 | 0 | .8 |
| 375 | 1,000 | 30.4 | 30.0 | 2.7 | 3.3 | .11 | .11 | 1.8 | 0.5 | 0 | 2.2 |
| 400 | 1,000 | 25.0 | 25.7 | 2.1 | 2.2 | .11 | .10 | 1.4 | 0 | 0 | 1.8 |
| 450 | 1,000 | 29.9 | 29.4 | 2.6 | 2.5 | .10 | .17 | 1.9 | [1]200 | 0 | 2.1 |
| 450 | 2,000 | 29.3 | 28.4 | 2.6 | 2.5 | .10 | .12 | 1.9 | [1]450 | 0 | 2.1 |
| 460 | 1,000 | 28.8 | 28.3 | 2.5 | 2.6 | .07 | .35 | 1.6 | 0.0 | 0 | 2.2 |
| 500 | 500 | 26.6 | 25.1 | 2.2 | 2.4 | .06 | .83 | 1.6 | 0.0 | 0 | 2.2 |
| 500 | 1,000 | 32.8 | 32.2 | 2.7 | 2.6 | .12 | .43 | 1.8 | 0.0 | 0 | 2.5 |
| 500 | 3,000 | 30.6 | 29.7 | 2.7 | 3.3 | .08 | .28 | 1.9 | [1]435 | 0 | 2.8 |
| 550 | 500 | 26.4 | 23.2 | 2.7 | 3.0 | .10 | 4.2 | 1.9 | 0.0 | 0 | 3.0 |
| 550 | 1,000 | 32.7 | 28.6 | 2.7 | 2.8 | .11 | 2.7 | 1.8 | 0.0 | 0 | 2.7 |
| 600 | 1,000 | 26.6 | 0 | 2.2 | 11.9 | .1 | 21.7 | 1.6 | 0.0 | 0 | 0 |

[1] Parts per million.

Referring now to Table I, the results show that in the case of nickel, the initiation temperature for the hydrogenation of carbon monoxide is in the 500° C. to 600° F. range. Thus at 500° F. there is a decrease in inlet and outlet carbon monoxide from 30.6 to 29.7 and an increase in carbon dioxide in and out of 2.7 to 3.3 percent. The quantity of carbon monoxide in the outlet gas stream decreases steadily as the temperature rises, and at 600° F. there is no carbon monoxide in the hydrogenated gas stream. At the same time carbon dioxide, which was present in less than 3 percent, is over 11 percent at 600° F. The gas analysis also shows that while some ethylene is hydrogenated, the hydrogenation is not complete until the temperature reaches 500° F. to 600° F., the carbon monoxide hydrogenation temperature. Further the quantity of methane shows that in addition to carbon monoxide hydrogenation, forming methane, the ethylene was hydrocracked to methane when the temperature reached 600° F.

It was also found in this and repeats of the work that at 600° F. where methanation of carbon monoxide occurs, there is a temperature runaway.

The use of palladium catalysts according to the practice of this invention is illustrated by the following examples.

EXAMPLE E

Conditions:
- Catalyst _____ 0.1% Pd (Cat. B).
- Pressure _____ 265 p.s.i.g.
- Temperature _____ As given.
- Space velocity _____ Do.

Composition of feed gas stream:
- CO _____ 31.0
- $H_2$ _____ 63.0
- $CO_2$ _____ 3.3
- $C_2H_2$ _____ 0.1
- $O_2$ _____ 0.3
- $C_2H_4$ _____ 2.5

The following data in Table IIa and IIb on methane formation, oxygen removal and acetylene hydrogenation were a result of the run.

TABLE IIa

| Temp. (°F.) | S.V. | $O_2$ In | $O_2$ Out | CO In | CO Out | $CH_4$ In | $CH_4$ Out |
|---|---|---|---|---|---|---|---|
| 365 | 10,000 | 0.26 | Percent 0.20 | 28.0 | 27.6 | 0.03 | 0.03 |
| 500 | 2,500 | 0.26 | P.p.m. 0–10 | 28.0 | 27.4 | 0.03 | 0.03 |
| 500 | 5,000 | 0.26 | 0–10 | 28.0 | 27.6 | 0.03 | 0.03 |
| 500 | 10,000 | 0.29 | 0–10 | 29.3 | 29.3 | 0.03 | 0.03 |
| 600 | 10,900 | 0.29 | 0–10 | 29.3 | 29.3 | 0.03 | 0.03 |
| 600 | 20,000 | 0.29 | 0–10 | 29.3 | 29.3 | 0.03 | 0.03 |
| 700 | 1,000 | 0.26 | 0–10 | 23.0 | 23.1 | 0.03 | 0.03 |
| 700 | 10,000 | 0.26 | 0–10 | 23.0 | 23.2 | 0.03 | 0.03 |
| 700 | 20,000 | 0.26 | 0–10 | 23.0 | 23.4 | 0.03 | 0.03 |
| 760 | 1,000 | 0.26 | 0–10 | 24.6 | 23.8 | 0.03 | 0.7 |
| 760 | 10,000 | 0.26 | 0–10 | 23.0 | 23.1 | 0.03 | 0.07 |
| 760 | 20,000 | 0.26 | 0–10 | 23.0 | 23.0 | 0.03 | 0.05 |

TABLE IIb

| Temp. (°F.) | S.V. | $CO_2$ In | $CO_2$ Out | $C_2H_4$ In | $C_2H_4$ Out | $C_2H_6$ Out | $C_2H_2$ Out, p.p.m. |
|---|---|---|---|---|---|---|---|
| 365 | 10,000 | 3.63 | 3.8 | 2.33 | 2.14 | 0.56 | <2 |
| 500 | 2,500 | 3.63 | 4.2 | 2.33 | 0.09 | 2.44 | <2 |
| 500 | 5,000 | 3.63 | 4.0 | 2.33 | 0.30 | 2.13 | <2 |
| 500 | 10,000 | 3.90 | 3.8 | 2.50 | 0.92 | 1.65 | <2 |
| 600 | 10,000 | 3.90 | 3.7 | 2.50 | 0.18 | 2.3 | <2 |
| 600 | 20,000 | 3.90 | 3.8 | 2.50 | 0.30 | 2.2 | <2 |
| 700 | 1,000 | 4.16 | 4.0 | 2.55 | 0.00 | 2.7 | <2 |
| 700 | 10,000 | 4.16 | 4.0 | 2.55 | 0.0 | 2.7 | <2 |
| 700 | 20,000 | 4.16 | 4.0 | 2.55 | 0.0 | 2.5 | <2 |
| 760 | 1,000 | 4.16 | 4.1 | 2.55 | 0.0 | 2.7 | <2 |
| 760 | 10,000 | 4.16 | 4.1 | 2.55 | 0.0 | 2.7 | <2 |
| 760 | 20,000 | 4.16 | 4.1 | 2.55 | 0.0 | 2.7 | <2 |

The data in Table IIa and IIb show that no conversion of carbon monoxide occurs until the temperature approaches 760° F. Above 700° F. ethylene is also removed. However, since this is near the runaway temperature this process would not be used for removal of oxygen, acetylene and ethylene. Oxygen and acetylene are removed by the process.

To remove ethylene as well as oxygen and acetylene the following process is employed.

EXAMPLE F

Conditions:
- Catalyst _____ 0.6% Pd (Cat. C).
- Pressure _____ 300.
- Temperature _____ As given.
- Space velocity _____ Do.

Composition of feed gas stream:
- CO _____ 31.0
- $H_2$ _____ 63.0
- $CO_2$ _____ 3.3
- $C_2H_2$ _____ 0.1
- $O_2$ _____ 0.3
- $C_2H_4$ _____ 2.5

Results of the hydrogenation process using a 0.6 percent palladium catalyst are given in Tables IIIa and IIIb.

TABLE IIIa

| Temp. (°F.) | S.V. | $O_2$ In Percent | $O_2$ Out Percent | Percent CO In | Percent CO Out | Percent $CH_4$ In | Percent $CH_4$ Out |
|---|---|---|---|---|---|---|---|
| 300 | 10,000 | 0.29 | 0.25 | 30.3 | 30.3 | 0.03 | 0.03 |
| 360 | 10,000 | 0.30 | 0.18 | 23.2 | 23.0 | 0.03 | 0.03 |
| 360 | 20,000 | 0.30 | 0.23 | 23.2 | 23.1 | 0.03 | 0.03 |
| | | | P.p.m. | | | | |
| 425 | 10,000 | 0.30 | 20 | 23.2 | 23.0 | 0.03 | 0.03 |
| 425 | 20,000 | 0.30 | 300 | 23.2 | 23.4 | 0.03 | 0.03 |
| 500 | 5,000 | 0.30 | 0–10 | 23.2 | 23.0 | 0.03 | 0.03 |
| 500 | 10,000 | 0.30 | 0–10 | 23.2 | 22.7 | 0.03 | 0.03 |
| 500 | 20,000 | 0.30 | 0–10 | 23.2 | 23.1 | 0.03 | 0.03 |
| 600 | 500 | 0.45 | 0–10 | 27.8 | 26.8 | 0.03 | 0.03 |
| 600 | 1,000 | 0.45 | 0–10 | 27.8 | 27.0 | 0.03 | 0.04 |
| 600 | 5,000 | 0.45 | 0–10 | 27.8 | 27.1 | 0.03 | 0.03 |
| 600 | 10,000 | 0.45 | 0–10 | 27.8 | 27.2 | 0.03 | 0.04 |
| 600 | 20,000 | 0.45 | 0–10 | 27.8 | 27.1 | 0.03 | 0.03 |
| 700 | 1,000 | 0.45 | 0–10 | 27.8 | 26.7 | 0.03 | 0.15 |
| 700 | 5,000 | 0.45 | 0–10 | 27.8 | 27.0 | 0.03 | 0.08 |
| 700 | 10,000 | 0.45 | 0–10 | 27.8 | 27.2 | 0.03 | 0.08 |
| 760 | 1,000 | 0.45 | 0–10 | 27.8 | 21.6 | 0.03 | 2.3 |
| 760 | 5,000 | 0.45 | 0–10 | 27.8 | 25.7 | 0.03 | 0.5 |
| 760 | 10,000 | 0.45 | 0–10 | 27.8 | 26.1 | 0.03 | 0.3 |
| 760 | 20,000 | 0.45 | 30 | 27.8 | 26.5 | 0.03 | 0.1 |

TABLE IIIb

| Temp. (°F.) | S.V. | Percent $CO_2$ In | Percent $CO_2$ Out | Percent $C_2H_4$ In | Percent $C_2H_4$ Out | $C_2H_6$ Out, Percent | $C_2H_2$ Out, p.p.m. |
|---|---|---|---|---|---|---|---|
| 300 | 10,000 | 3.83 | 3.84 | 2.62 | 2.58 | 0.12 | <2 |
| 360 | 10,000 | 3.38 | 3.5 | 2.22 | 1.5 | 0.9 | <2 |
| 360 | 20,000 | 3.38 | 3.5 | 2.22 | 1.9 | 0.5 | <2 |
| 425 | 10,000 | 3.38 | 3.6 | 2.22 | 0.36 | 2.1 | <2 |
| 425 | 20,000 | 3.38 | 3.5 | 2.22 | 0.53 | 1.8 | <2 |
| 500 | 5,000 | 3.38 | 3.4 | 2.22 | [1]13 | 2.5 | <2 |
| 500 | 10,000 | 3.38 | 3.6 | 2.22 | [1]300 | 2.5 | <2 |
| 500 | 20,000 | 3.38 | 3.4 | 2.22 | [1]330 | 2.4 | <2 |
| 600 | 500 | 0.0 | 0.8 | 4.46 | 0.0 | 5.0 | <2 |
| 600 | 1,000 | 0.0 | 0.6 | 4.46 | 0.0 | 4.9 | <2 |
| 600 | 5,000 | 0.0 | 0.6 | 4.46 | 0.0 | 4.8 | <2 |
| 600 | 10,000 | 0.0 | 0.6 | 4.46 | [1]25 | 4.8 | <2 |
| 600 | 20,000 | 0.0 | 0.6 | 4.46 | [1]40 | 4.9 | <2 |
| 700 | 1,000 | 0.0 | 1.2 | 4.46 | 0.0 | 4.6 | <2 |
| 700 | 5,000 | 0.0 | 0.8 | 4.46 | 0.0 | 4.7 | <2 |
| 700 | 10,000 | 0.0 | 0.8 | 4.46 | 0.0 | 4.6 | <2 |
| 760 | 1,000 | 0.0 | 3.8 | 4.46 | 0.0 | 4.9 | <2 |
| 760 | 5,000 | 0.0 | 1.3 | 4.46 | 0.0 | 5.0 | <2 |
| 760 | 10,000 | 0.0 | 1.0 | 4.46 | 0.0 | 5.1 | <2 |
| 760 | 20,000 | 0.0 | 0.8 | 4.46 | 0.0 | 5.1 | <2 |

[1] Parts per million.

Table III shows that both oxygen and acetylene are removed through the use of this catalyst even at 425° F. The data also show that at 600° F. ethylene is removed, and even at 580° F. at a lower space velocity, through the use of this catalyst, whereas with 0.1 percent palladium this temperature is 700° F. Thus, with Catalyst C there is adequate leeway between ethylene removal and the carbon monoxide initiation temperature of 760° F. Other variations and ramifications will occur to one skilled in the art. These modifications are deemed to be within the scope of this invention.

What is claimed is:

1. In the process for the purification of a gas stream containing primarily hydrogen and carbon monoxide, but also small quantities of oxygen, acetylene and ethylene, an improvement for hydrogenating either the acetylene and oxygen components or the acetylene, oxygen and ethylene components with the hydrogen present in said stream which comprises at a temperature of 250° F. to 700° F. passing said gas through a bed of a catalyst of alumina having a surface area of 200 to 450 square meters per gram activated with palladium catalyst selectively to hydrogenate the oxygen, acetylene and ethylene components in said stream without significant conversion of carbon monoxide to methane or shifting of carbon monoxide to carbon dioxide, 0.1 to 0.3 weight percent palladium being used in the case of the acetylene-oxygen component, and 0.5 to 1 weight percent palladium being used in the case of the acetylene-oxygen-ethylene component.

2. The process of claim 1 wherein the gas stream is a by-product gas stream resulting from the pyrolysis of natural gas.

3. The process of claim 1 wherein the gas stream has the following composition.

| Component: | Range, mol percent |
|---|---|
| $H_2$ | 55–65 |
| CO | 25–35 |
| $O_2$ | 0.1–4 |
| $C_2H_2$ | 0.5–1 |
| $C_2H_4$ | 0.2–3.0 |

4. The process of claim 1 wherein the components being hydrogenated are acetylene and oxygen.

5. The process of claim 1 wherein the components being hydrogenated are acetylene, oxygen and ethylene.

References Cited

UNITED STATES PATENTS 2,582,885   1/1952   Rosenblatt _____ 23—2
3,084,023   4/1963   Anderson et al. _____ 23—3

OSCAR R. VERTIZ, *Primary Examiner.*

EARL C. THOMAS, *Assistant Examiner.*

U.S. Cl. X.R.

252—373; 260—677